(No Model.)
F. W. MORGAN & R. WRIGHT.
VALVED PNEUMATIC TIRE.
No. 507,026.      Patented Oct. 17, 1893.
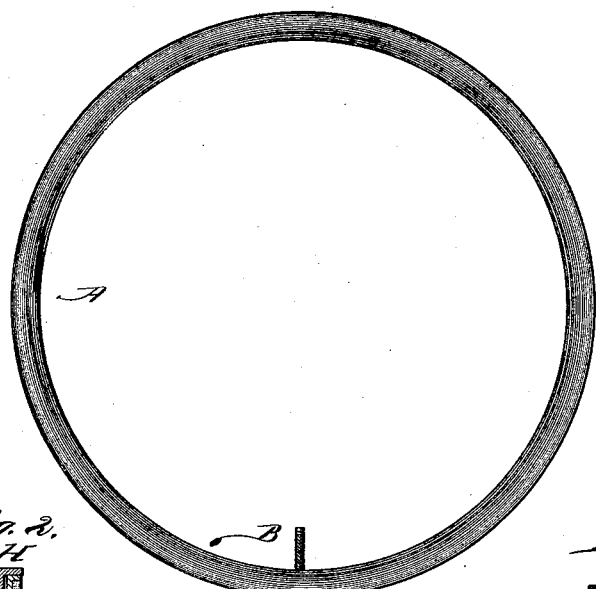
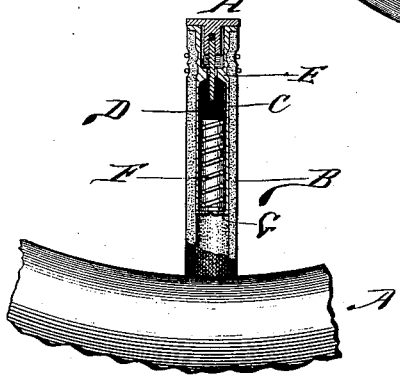
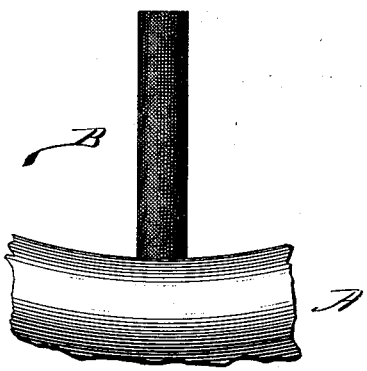
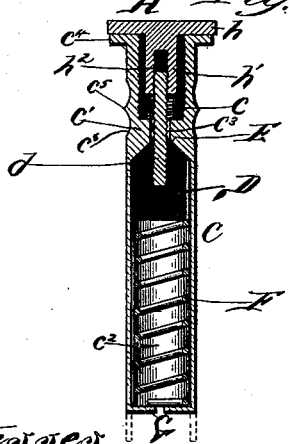
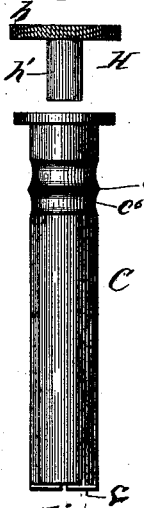
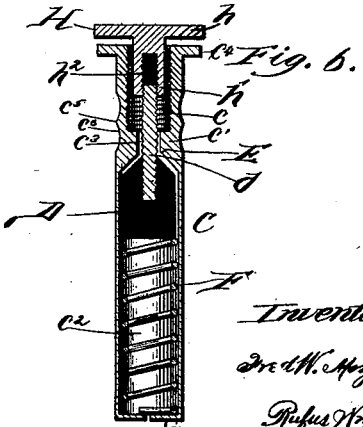
Witnesses
Inventors
Fred W. Morgan
Rufus Wright
By Chas. G. Page
Atty

UNITED STATES PATENT OFFICE.

FRED W. MORGAN AND RUFUS WRIGHT, OF CHICAGO, ILLINOIS.

VALVED PNEUMATIC TIRE.

SPECIFICATION forming part of Letters Patent No. 507,026, dated October 17, 1893.

Application filed October 26, 1892. Serial No. 450,069. (No model.)

*To all whom it may concern:*

Be it known that we, FRED W. MORGAN and RUFUS WRIGHT, both citizens of the United States, residing at Chicago, in the county of Cook and State of Illinois, have invented a certain new and useful Improvement in Valved Pneumatic Tires, of which the following is a specification.

Our invention relates to valved attachments adapted to permit the tire to be inflated from time to time, as may be needed, and comprising means for temporarily connecting the inflatable air tube with an air pump, and a valve for opening and closing the duct between the air tube and the temporarily applied pump.

In accordance with our invention, the inflatable tire tube has its inlet and outlet duct provided by a small flexible tube which is at one end attached to and arranged to project from the seating portion of the tire so as to project through a suitable opening in the wheel rim and normally stand within the plane of the wheel. The valve device or mechanism is entirely comprised within a small tubular shell or casing which is removably fitted within the outer end portion of the small flexible tube, and which is adapted for alternate connection with a cap and an air-pump, the said cap being adapted to close the outer end of the shell and being provided upon its inner or under side with a stem which enters a threaded portion of the shell and which is provided with a short threaded socket adapted to receive and engage a threaded portion of the valve stem. By such arrangement no screw threads whatsoever are exposed to the open air when the shell is closed by the cap, and hence the cap can at any time be readily unscrewed, it being observed that if any exposure of the threads were permitted, the corrosion or rusting of the thread would soon render the device extremely difficult to work. The length of this shell or casing is so proportioned with reference to its flexible containing tube that when the tire is applied to a wheel rim having an aperture through which the flexible tube is inserted, said tube can be bent at a point between the inner side of the wheel rim and the point at which the shell or casing terminates within its containing tube; which arrangement permits the outer end portion of the said flexible tube to be deflected laterally for the purpose of bringing the outer or inlet end of the shell or casing within convenient reach of the user of an air-pump and out of the way of the spokes of the wheel. By said arrangement the valve shell or casing which provides a valve chamber is not secured to the wheel tire but is removably inserted within a flexible tube which latter is secured to the tire, and hence in placing the tire upon a wheel rim and removing it therefrom, injury to the tire will not occur since the flexible tube will readily yield to any force tending to deflect it laterally, and in like manner it can be deflected laterally when inflating the tire without injuring the latter. The shell or casing thus containing the entire valve mechanism and requisite for connection with an air-pump, can be economically made, readily applied, and as readily removed, and hence, in case of accident to the valve or its adjuncts, the shell or casing can be removed and repaired or replaced by another, without sending the wheel or machine to a repair shop or factory, and since the device is small, compact, light, and cheap, the rider of a pneumatic machine can without inconvenience carry in his tool bag an extra shell or casing containing such valve mechanism, and thus be prepared for emergencies.

In the accompanying drawings,—Figure 1 represents a pneumatic tire understood to comprise our invention. Fig. 2 shows on a larger scale a longitudinal central section through a portion of the flexible tube, and its contents, and illustrates the cap applied so as to hold the valve closed, the remaining portion of the flexible tube, and a part of the tire, being shown in elevation. Fig. 3 shows the flexible tube and a portion of the tire in elevation. Fig. 4 is a central longitudinal section through the shell or casing and valve mechanism on a still larger scale, with the cap applied as in Fig. 2. Fig. 5 represents in elevation, the shell or casing, and the cap detached therefrom. Fig. 6 is a central longitudinal section through the shell or casing and valve mechanism, and illustrates the cap applied in a way to permit the valve to be opened for the purpose of deflating the tire. Fig. 7 is an end view of the shell or casing, and further illustrates the provision of lugs or lips at the inner end thereof.

The pneumatic tire A may be of any suitable or desired construction, and hence its internal organization need not be shown. The tire is provided with a short flexible air tube B suitably attached to the tire and arranged to project from the inner or seating portion of the tire and applied to admit air within the tire during the operation of blowing up the same. The small, cylindric shell or casing C is adapted for insertion within the outer end portion of the tube B, and contains a valve D, (shown in solid black,) a seat E for the valve, and a spring F arranged to normally seat or close the valve. The shell or casing is also provided at one end with pliable lips G which can be bent inwardly so as to form a seat or abutment for one end of the spring and thereby insure the retention of both the spring and the valve within the shell or casing. The shell is removably held within the tube B and hence after removing the shell from such tube, the pliable lips G can be bent back so as to open the inner end of the shell and thereby permit the spring and valve to be removed.

The valve-stem $d$ is threaded, and in connection with the shell or casing we provide a cap H which is formed with a milled head $h$ and a centrally arranged stem $h'$. The stem portion of the cap is adapted to fit within or enter a short bore or socket $c$ in one end of the shell, which latter is provided with a partition or partition-portion $c'$ arranged between said socket and the main or valve chamber $c^2$ which contains the valve and spring.

The partition or partition portion $c'$ of the shell or casing is conveniently adapted to provide a seat E for the valve, and it is further adapted to provide an air-passage $c^3$ through which the valve-stem is also arranged to extend. The neck or stem of the cap is provided with a short, threaded bore or socket $h^2$, adapted to receive one end portion of the threaded valve stem. By such arrangement the cap can be applied so as to cause the threaded valve stem to engage in its threaded bore or socket $h^2$, and by then properly turning the cap, the valve stem can be drawn in a direction to draw and hold the valve firmly against its allotted seat (as in Fig. 4), and also cause the cap to bind upon the flanged end $c^4$ of the shell, so as to prevent leakage. The cap can also be used for holding the valve open, in order to deflate the tire, and to such end the cap can be screwed back upon the valve stem in a direction away from the shell or casing as in Fig. 6, whereby, by then depressing the cap, the valve will be opened. The bore or socket $c$ of the shell or casing is also threaded, so that when the cap is removed as in Fig. 5, the threaded nozzle of an air pump can be screwed into said bore or socket. The length of the shell or casing C is such that when it is fitted within the flexible tube B, it will terminate short of the inner end of the tube as in Fig. 2, by which arrangement, the tube portion between the valve-casing and the tire can be bent so as to permit the tube to be deflected for the convenience of the user of an air pump. Said arrangement also permits the tube B to be united with the inflatable air tube prior to the introduction of the latter within the sheath, and further permits the valve shell or casing to be readily introduced within, and as readily removed from the flexible tube B. By arranging the valve and spring within a comparatively short shell or casing C which is also adapted both for the cap and for engagement with an air pump, the whole can be removed without disturbing the flexible tube B, and hence, should any accident happen to the valve, or its efficiency become in anywise impaired, it can be removed by the owner of the machine.

To insure a close fit and firm retention of the shell or casing C within the flexible tube B, the shell is provided with an annular rib or flange portion $c^5$ and one or more annular grooves or depressions $c^6$, so that when the shell is introduced within the tube, the latter will be stretched by the rib and thereby a more secure engagement between the two, afforded. The grooves $c^6$ also permit the tube to be more effectively wrapped or tied with cord or wire, which will depress the material of the tube at such points and thereby assist in making a secure and air tight joint. The lugs or lips G while serving to hold the spring within the shell or casing, can be bent out as in dotted lines, Fig. 4, in case it is found desirable after detaching the shell or casing from the flexible tube, to remove the spring or spring and valve. The flexible tube can be applied to the inflatable air tube of the tire during the construction of the tire, and can be equipped with the shell or casing C containing the said valve devices or mechanism, so that when applied to a wheel rim, it will simply be necessary to insert the flexible tube through a suitable aperture in said rim. The flexible tube will therefore have its inner end portion in open communication with the interior of the tire, while its outer end portion will contain a removable shell or casing adapted for temporary connection with an air-pump and containing a complete valve mechanism substantially as set forth.

Broadly considered the feature of a check valve having a threaded stem and a locking nut thereon is not new, the same being embodied in Letters Patent of the United States No. 276,121, of April 17, 1883, and No. 362,532, of May 10, 1887, in each of which the automatically closing valve is locked by a nut on its threaded stem.

What I claim as my invention is—

1. A pneumatic tire provided with a valve for the purpose set forth, a shell or casing inclosing the valve and adapted for connection with an air pump, a threaded valve-stem, and a cap for engaging the valve stem so as to hold the valve tight upon its seat, substantially as described.

2. The combination with a pneumatic tire of the shell or casing C containing a valve, and provided with an annular rib $c^5$, said shell being fitted within a flexible tube B which connects with the interior of the tire, substantially as and for the purpose described.

3. The shell or casing C containing a valve and spring for the purpose set forth, and provided at one end with one or more pliable lips G which can be bent into position to retain the spring within the shell or casing, and also bent back to allow the spring to be removed, substantially as described.

4. The combination with a pneumatic tire provided with the flexible tube B, of the shell C having at one end a threaded socket, the spring controlled valve confined within the shell or casing and having a threaded stem, and the cap H having a stem portion $h'$ provided with a threaded socket, substantially as and for the purpose described.

FRED W. MORGAN.
RUFUS WRIGHT.

Witnesses:
W. D. MIDDLETON,
CHAS. G. PAGE.